March 18, 1930.  J. R. ZAIDEN  1,751,378
RUMBLE SEAT AND LOCKING DEVICE
Filed Oct. 5, 1928
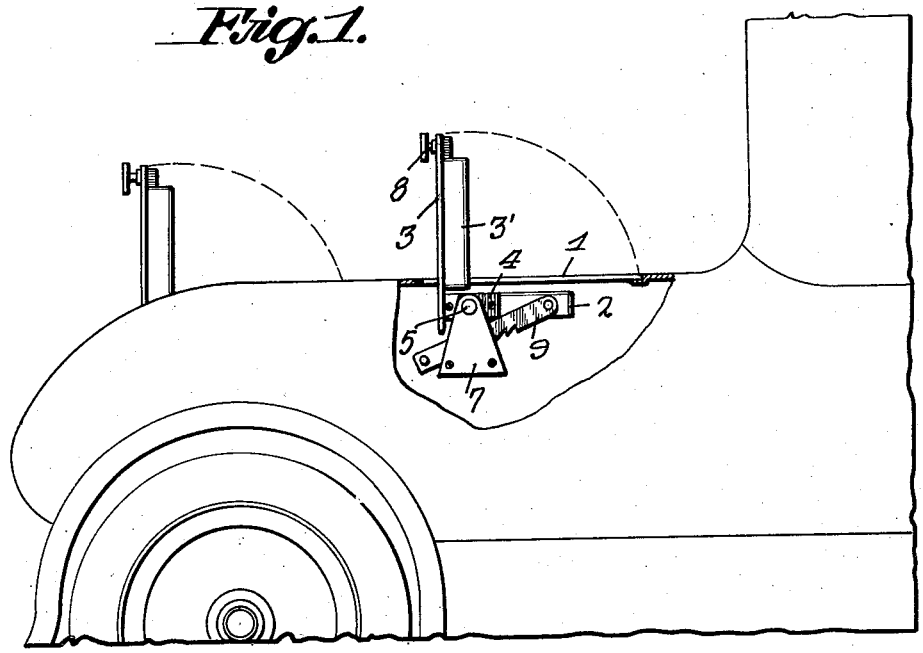
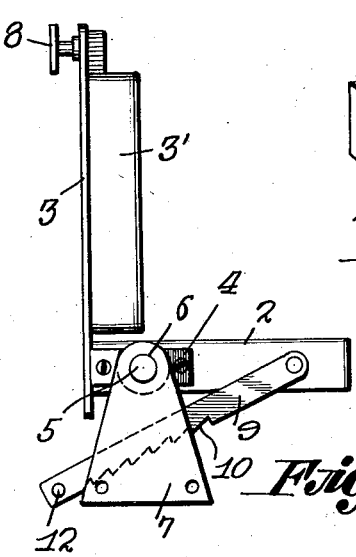
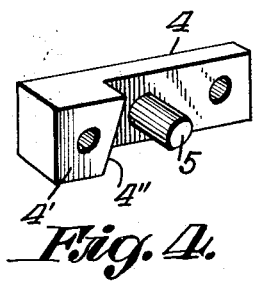
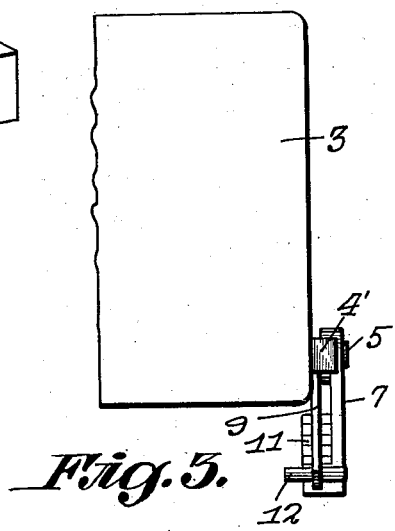
Joseph R. Zaiden,
INVENTOR
BY Victor J. Evans
ATTORNEY Patented Mar. 18, 1930

1,751,378

UNITED STATES PATENT OFFICE

JOSEPH R. ZAIDEN, OF PITTSBURGH, PENNSYLVANIA

RUMBLE SEAT AND LOCKING DEVICE

Application filed October 5, 1928. Serial No. 310,530.

This invention relates to improvements in automobiles, the general object of the invention being to provide a pair of rumble seats in the rear deck of the automobile, with means for locking each set in operative position so that there is no danger of the seat moving to closed position, such means permitting the seat to be folded to closed position when moved by hand to releasing position.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a fragmentary side view, with parts broken away, showing an automobile equipped with the invention.

Figure 2 is a side view showing one of the seats in operative position.

Figure 3 is a fragmentary view of the rear of the seat.

Figure 4 is a view of a bracket which carries the pivot pin.

As shown in Figure 1, the rear deck A of the automobile is formed with a pair of openings, the front opening being shown at 1 and a seat 2 is placed in each opening, the back 3 of which forms a closure for the opening when folded downwardly. This back carries the usual cushion 3' and said back is fastened to the seat. A bracket 4 is fastened to each side of each seat adjacent the rear thereof and this bracket carries a pivot 5 which engages an opening 6 formed in a bracket 7, a pair of which is provided for each seat, these brackets being suitably connected with the body of the automobile. Each bracket 4 is formed with a thickened rear end 4', the front face of which is beveled, as shown at 4", and this beveled face is adapted to engage a part of the bracket 7 when the seat is in operative position to limit the upward movement of the seat and the rear movement of the back. By moving the back forwardly and downwardly, the combined seat and back will pivot on the bracket 7 until the back 3 engages the walls of the opening 1 so that the back will close said opening. The free end of the back 3 is provided with a handle 8 for facilitating the movement of each seat and a suitable lock may be provided for locking each back in closed position.

A bar 9 is pivoted to each side of each seat 2 adjacent the front end of the seat and each bar is provided with the teeth 10 on its lower edge which are adapted to engage the teeth 11 formed on the thickened lower part of each bracket 7, these teeth being so formed that when they are in mesh, downward movement of the seat 2 and the back 3 is prevented. The lower end of each bar 9 is provided with a pin 12 which forms a handle whereby the bar can be lifted to disengage its teeth from the teeth 11 so that the seat and back can be moved to inoperative position or the bar can be lifted by pressure applied to its front part. When the bar is lifted by the pin, the hand must be passed through that part of the opening in rear of the back.

From the foregoing it will be seen that I have provided an automobile with a pair of rumble seats so that a greater number of persons can be carried in the automobile than where the automobile is furnished with but one seat and it will also be seen that I have provided simple means for holding each seat in operative position, such holding means being easily and quickly moved to releasing position to permit the seat to be lowered so that its back will close the opening in the deck.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An automobile of the class described having an opening in its rear deck, a seat pivoted below said opening and having its back adapted to close the opening when the seat is in inoperative position, latch means for latching the seat in operative position, such means comprising a toothed bar pivotally connected with the seat and a toothed member with which the teeth of the bar engage and a handle on the bar for moving the same out of engagement with the teeth of said toothed member.

2. A rumble seat comprising a seat part and a back part, a member fastened to each side of the seat adjacent the rear thereof, a pivot carried by each member, a pair of supporting brackets having holes therein for receiving the pivots, the members having shoulders thereon for engaging the brackets to limit the upward movement of the seat and back, said brackets having thickened portions provided with inclined upper edges which are toothed, a bar pivotally connected with each side of the seat and having its lower edge toothed to engage the teeth on each bracket for locking the seat and back in operative position and a handle on the lower end of each bar whereby the bar can be raised to disengage its teeth from the teeth of the bracket.

In testimony whereof I affix my signature.

JOSEPH R. ZAIDEN.